United States Patent
Mass et al.

(10) Patent No.: US 9,309,445 B2
(45) Date of Patent: Apr. 12, 2016

(54) POLYMERIC COMPOSITION WITH INTERMIXED COLOR BALLOONS

(71) Applicant: Ford Global Technologies, LLC, Dearborn, MI (US)

(72) Inventors: Noah Barlow Mass, Ann Arbor, MI (US); Jim Antime Marleau, Canton, MI (US); Richard E. Newton, White Lake, MI (US); Jessica Smith, Roseville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 178 days.

(21) Appl. No.: 14/083,699

(22) Filed: Nov. 19, 2013

(65) Prior Publication Data

US 2015/0136299 A1 May 21, 2015

(51) Int. Cl.
| | |
|---|---|
| *C08K 9/00* | (2006.01) |
| *C09J 5/00* | (2006.01) |
| *C08K 9/10* | (2006.01) |
| *C09J 7/02* | (2006.01) |
| *C09J 11/02* | (2006.01) |

(52) U.S. Cl.
CPC ... *C09J 5/00* (2013.01); *C08K 9/10* (2013.01); *C09J 7/02* (2013.01); *C09J 11/02* (2013.01); *C09J 2205/102* (2013.01); *C09J 2433/00* (2013.01); *C09J 2463/00* (2013.01); *C09J 2475/00* (2013.01); *C09J 2481/00* (2013.01); *C09J 2483/00* (2013.01); *Y10T 156/10* (2015.01)

(58) Field of Classification Search
CPC ............... C08J 11/04; C08K 9/10; C09J 5/00
See application file for complete search history.

(56) References Cited

U.S. PATENT DOCUMENTS

| | | | |
|---|---|---|---|
| 5,308,887 A | 5/1994 | Ko et al. | |
| 6,444,725 B1 | 9/2002 | Trom et al. | |
| 2006/0216513 A1* | 9/2006 | Musick | B82Y 30/00 |
| | | | 428/404 |
| 2008/0060550 A1 | 3/2008 | MacDonald et al. | |
| 2009/0098081 A1 | 4/2009 | MacDonald et al. | |
| 2011/0117174 A1* | 5/2011 | Kergosien | A61K 8/731 |
| | | | 424/443 |

OTHER PUBLICATIONS

Paper, Film & Foil Converter; Measure Pressure with Thin Film; David J. Bentley and Gerard E. Mayers, Jr.,; May 1, 2013.

* cited by examiner

*Primary Examiner* — Hannah Pak

(74) *Attorney, Agent, or Firm* — Damian Porcari; Law Firm of Dr. Junqi Hang, PLC

(57) ABSTRACT

According to one or more embodiments, a polymeric article includes a polymeric composition which in turn includes a volume of polymer intermixed with a number of color balloons, at least a portion of the number of color balloons each including a shell enclosing a colored agent.

15 Claims, 2 Drawing Sheets

POLYMERIC COMPOSITION WITH INTERMIXED COLOR BALLOONS

TECHNICAL FIELD

The disclosed inventive concept relates generally to polymeric composition such as adhesives and sealants, and particularly polymeric composition with intermixed color balloons.

BACKGROUND

Several existing adhesive/sealant compositions require force to be applied to wet out the adhesive/sealant to the surfaces being sealed. If the pressure is not evenly applied or if the amount of force is not sufficient there may be leaks. This leakage may be particular to certain vehicular parts, including side door, rear door, and lift-gate water-shields.

It would thus be advantageous if adhesives/sealants may be provided to solve one or more of these identified problems.

SUMMARY

The disclosed inventive concept is believed to overcome one or more of the problems associated with surface adhesion and more particularly surface amendment using a polymeric article.

According to one or more embodiments, a polymeric article includes a polymeric composition which in turn includes a volume of polymer intermixed with a number of color balloons, at least a portion of the number of color balloons each including a shell enclosing a colored agent. The volume of polymer may include a water content of less than 3 percent by weight. The volume of polymer may include at least one of epoxy, silicone, acrylic, polysulfide and polyurethane. The number of color balloons may have an average particle size of 1 to 1,000 microns. The colored agent may include water insoluble pigment in no less than 50 percent by weight. The colored agent may include water soluble dye in no less than 50 percent by weight. The polymeric article may further include a housing enclosing the polymeric composition such that the polymeric composition is dischargeable from the housing upon a force applied. The polymeric article may further include a backing and a cover sandwiching there between the polymeric composition.

In one or more embodiments, a method may be provided to amend a defect on a surface, the method including overlaying the hole on the surface with a polymeric article, the polymeric article including a layer of a polymeric composition and a skin layer with the layer of the polymeric composition positioned between the surface and the skin layer, the polymeric composition including a volume of polymer intermixed with a number of color balloons, at least a portion of the number of color balloons each including a shell enclosing a colored agent; and applying pressure onto the skin layer to effect adhesion of the skin layer to the surface such that at least a portion of the colored agent is released from the shell into the volume of polymer to form a colored polymer. The method may further include assessing color distribution of the colored polymer. The method may further include adjusting pressure application based on a result of the assessing.

The above advantages and other advantages and features will be readily apparent from the following detailed description of embodiments when taken in connection with the accompanying drawings.

BRIEF DESCRIPTION OF THE DRAWINGS

For a more complete understanding of embodiments of this invention, reference should now be made to the embodiments illustrated in greater detail in the accompanying drawings and described below by way of examples wherein.

DETAILED DESCRIPTION OF ONE OR MORE EMBODIMENTS

Figure 1A:
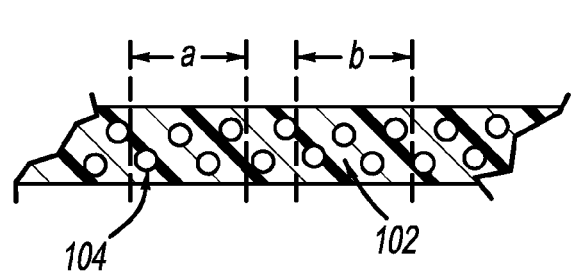
FIG. 1A illustratively depicts a cross-sectional view of a polymeric composition according to one or more embodiments of the present invention.

As referenced in the FIG.s, the same reference numerals are used to refer to the same components. In the following description, various operating parameters and components are described for different constructed embodiments. These specific parameters and components are included as examples and are not meant to be limiting.

As will be detailed herein below, the present invention in one or more embodiments is advantageous at least in that extent and/or uniformity of a adhesive/sealant application can be observed, optionally in real-time, via the use of a polymeric composition intermixed with color balloons. The color balloons may be made pressure sensitive. In particular, color release may be coordinated as a function of pressure applied. In this connection, it may be readily observable as to the areas where the adhesive/sealant contact is not sufficient or include gaps. In this connection, the polymeric composition may be used as a sealant and/or an adhesive.

Figure 1B:
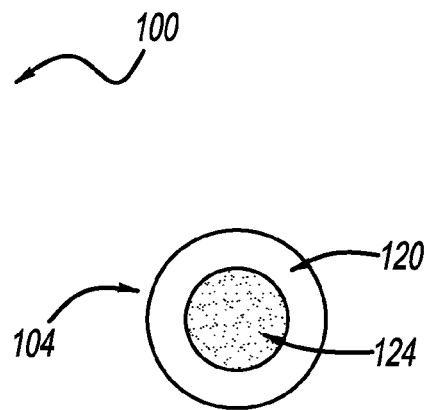
FIG. 1B illustratively depicts an enlarged partial view of the polymeric composition referenced in FIG. 1A.

According to one or more embodiments, and as depicted in FIG. 1A in view of FIG. 1B, a polymeric composition generally shown at 100 includes a volume of polymer 102 intermixed with a number of color balloons 104, at least a portion of the number of color balloons each including a shell 120 enclosing a colored agent 122.

The term "intermixed" may specified as follows in view of FIG. 1A. Portions "a" and "b" of the polymeric composition 100 are randomly selected and of same volume. The term "intermixed" may be determined when a weight percent of the number of color balloons 104 in the portion "a" is substantially identical, for instance, within a range of 90 percent to 110 percent or 95 percent to 105 percent, relative to a weight percent of the number of color balloons 104 in the portion "b".

The polymer 102 may be of any suitable chemistry. Non-limiting examples of the polymer 102 include acrylic, silicone, epoxy, rubber, latex, polysulfide, and polyurethane.

Other examples of the polymer 102 may include polybutadiene (BR for butadiene rubber), chloroprene rubber (CR), butyl rubber (copolymer of isobutylene and isoprene), styrene-butadiene rubber (copolymer of styrene and butadiene, SBR), nitrile rubber (copolymer of butadiene and acrylonitrile, NBR), ethylene propylene rubber (EPM, a copolymer of ethylene and propylene), ethylene propylene diene rubber (EPDM, a terpolymer of ethylene, propylene and diene), epichlorohydrin rubber (ECO), polyether block amides (PEBA), chlorosulfonated polyethylene (CSM), and ethylene-vinyl acetate (EVA).

The polymeric composition 100 may be used for any suitable purposes. When used as a sealant, non-limiting types of areas of usage may include asphalt sealants, pipe thread sealants, acoustic sealants, adhesive sealants, aerospace sealants, aircraft sealants, aquarium sealant, car sealant, casting sealants, cement sealants, concrete sealants, construction sealants, dental sealants, electronic sealants, engine sealants, fibrin sealants, firestop sealants, floor sealants, gasket sealants, hydraulic sealants, impregnating sealants, joint sealants, marine sealants, metal sealants, military sealants, patio sealants, paint sealants, radiator sealants, reservoir sealants, roof sealants, seam sealants, surgical sealants, tile sealants, valve sealants, and wood sealants.

The polymer 102 may be of a color which can be readily distinguished from the color released from the color balloons 104. In certain instances, the polymer 102 may be clear of any colors or may be of color white in variable shades, such as bleached white, off white, light cream, cream, beige, light gray, or gray.

Distinguish-ability of any two color pairs may be assessed via any known and well-accepted standards, such as International Organization for Standardization (ISO). ISO provides technical standards for the manufacture of pigments and dyes and ISO standards define various industrial and chemical properties, and how to test for them.

The volume of polymer 102 may be substantially free of water, particularly when the polymeric composition 100 is employed as a sealant. In certain instances, the volume polymer 102 may include a water content of no greater than 5 percent, 3 percent, 1 percent, or 0.1 percent by weight.

Total amount of the color balloons 104 as present in the polymeric composition 100 may be variable dependent upon several parameters including, for instance, layer thickness of the polymeric composition 100 as applied, average particle size of the color balloons 104, and value range of pressure as imparted.

The color balloons 104 may be presented in the polymeric composition 100 in any suitable particular sizes. In certain instances, the number of color balloons 104 may have an average particle size of no less than 1, 5, 10, 50 or 100 microns, and no greater than 1,000, 500, or 300 microns. In certain particular instances, the number of color balloons 104 may have an average particular size of 10 to 300 microns.

The colored agent 122 may be of any suitable chemistry, and include one or more of pigments and dyes. A dye is generally categorized as a colored substance that has an affinity to the substance to which it is being applied, and the addition of the dye to the substrate results in a solution. In contrast, a pigment is generally insoluble in and has little or no affinity for the substrate accepting the pigment, and the addition of the pigment to the substrate results in a suspension.

Dyes may be derived from plant sources such as roots, berries, bark, leaves, and wood, fungi, and lichens.

Pigments may include various clays, ochres, iron oxides, calcium carbonate, mica, silicas and talcs. Pigments of synthetic sources may include engineered molecules, calcined clays, blanc fixe, precipitated calcium carbonate, and synthetic pyrogenic silicas.

The shell 120 of the colored balloons 104 may be formed of any suitable material, a material in general breakable upon pressure. In general, the shell 102 is to be designed such that the rupture of the color balloons 104 is closely correlated to the amount of pressure applied. In addition, the design may be carried out to effect that the total number of balloons 104 ruptured may be linearly correlated to the pressure applied. In other words, once ruptured, the entire colored agent in each balloon should be discharge in its entirety such that the amount of color discharge from each balloon should be all or none and not be variable by increments based on the pressure applied.

Non-limiting examples of the material for forming the shell 120 include glass and plastics. When glass is used, the shell 120 may be configured as thin glass film with its thickness and other dimensions tailored to be closely responsive to an imparting pressure.

The colored agent 124 may be presented as water soluble or water insoluble dependent upon the chemistry of the polymer 102. When made water soluble, and upon rupture of the shell 120, the amount of the colored agent 124 that gets released into the volume of polymer 102 may form a movement pathway there within of a limited distance. This is mainly because the colored agent 124, being water soluble, does not necessarily blend well with the polymer 102. On the other hand and when made water insoluble, the amount of the colored agent 124 upon release from the shell 120 may find its way in and through the volume of polymer 102 relatively more easily. As a result, a more expanded pattern of settlement for the colored agent 104 as released can be expected.

As dyes are in general water soluble, to make the colored agent 124 relatively more water soluble, the colored agent 124 may include no less than 50 percent, 60 percent, 70 percent, 80 percent, or 90 percent by weight of the dyes.

As pigments are in general water insoluble, to make the colored agent 124 relatively less water soluble, the colored agent 124 may include no less than 50 percent, 60 percent, 70 percent, 80 percent, or 90 percent by weight of the pigments.

Without wanting to be limited to any particular theory, it is believed that the settlement pattern of the colored agent 124 made water soluble may appear to be isolated dots distributed across the volume of polymer 102. This will help locate where specifically the pressure is applied and how much is applied. On the other size, the settlement pattern of the colored agent 124 made water insoluble may appear to be interconnected streams or webs of color. Both patterns should be helpful in identifying the uniformity of pressure application and hence any potential defect due to an imbalance of pressure application.

Figure 1C:
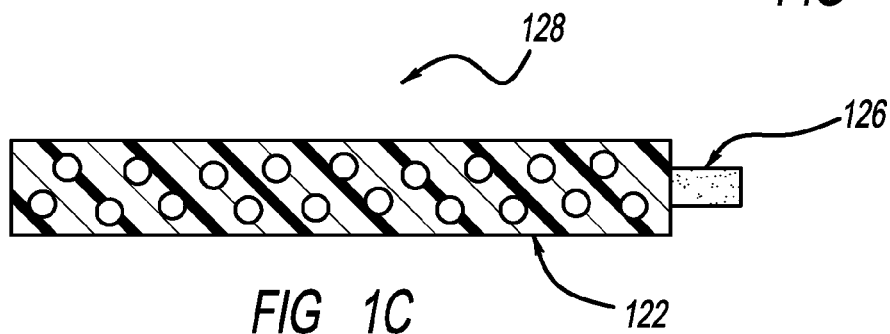
FIG. 1C illustratively depicts a cross-sectional view of a polymeric article containing the polymeric composition referenced in FIG. 1A.

In certain instances, and as depicted in FIG. 1C, the polymeric composition 100 may be provided inside of a housing 122, together to form a polymeric article 128. In this configuration, the polymeric composition 100 is dischargeable from the housing 122 upon a force applied thereto. The housing 122 can be of any suitable shapes. In certain particular instances, and as depicted in FIG. 1C, the housing 122 is in the shape of a tube with a detachable cap 126. The polymeric composition 100 can be squeezed out from the housing 122 through the detachable cap 126 upon an application of pressure on the housing 122.

Figure 1D:
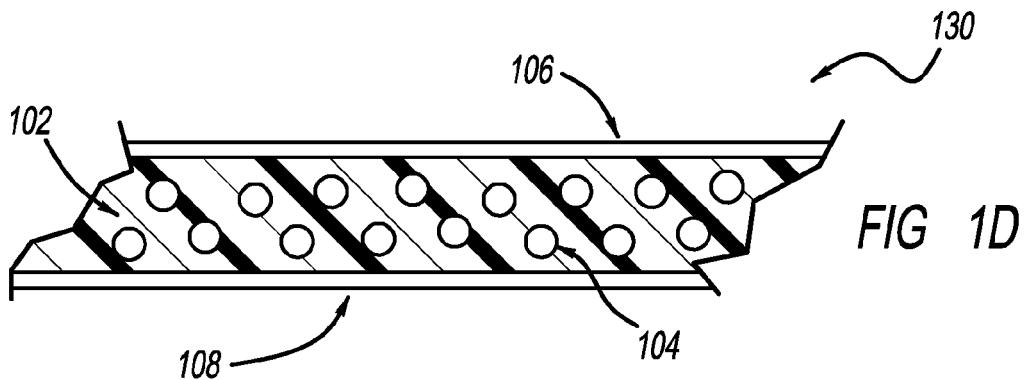
FIG. 1D illustratively depicts a cross-sectional view of a variation of the polymeric article referenced in FIG. 1C.

In certain other instances, as illustratively depicted in FIG. 1D, the polymeric composition 100 may be presented with a backing 106 and a cover 108 sandwiching there between the polymeric composition 100 to form a polymeric article generally shown at 130. The backing 106 can be of any suitable material such as wood, plastic, metal, paper or any combinations thereof for the purpose of providing support for the volume of polymer 102 intermixed with the number of color balloons 104. The cover 108 can be of any suitable material such as wood, plastic, metal, paper of any combinations thereof for the purpose of reducing any unnecessary disturbance to the volume of polymer 102 intermixed with the number of color balloons 104. In certain particular instances, either or both of the backing 106 and cover 108 can be made readily detachable or peel-able from the volume of polymer 102 intermixed with the number of color balloons 104.

Figure 1E:
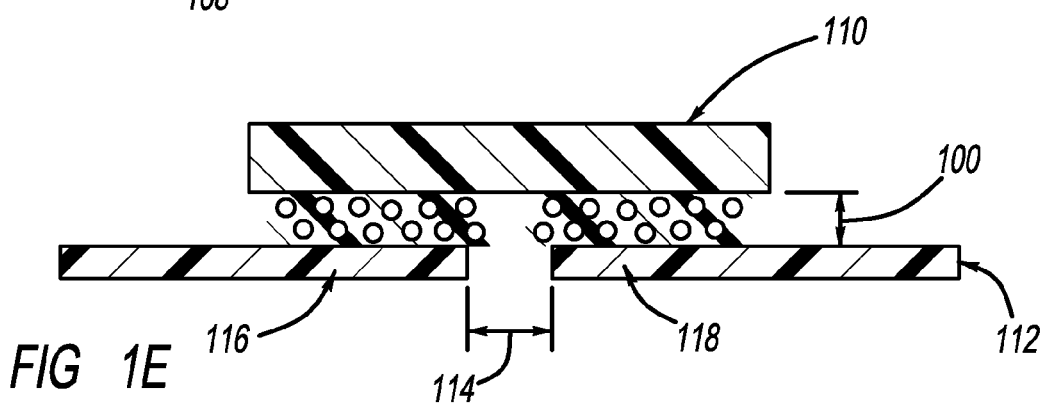
FIG. 1E illustratively depicts a cross-sectional view of the polymeric composition referenced in FIG. 1A, as applied to a surface.
Figure 2:
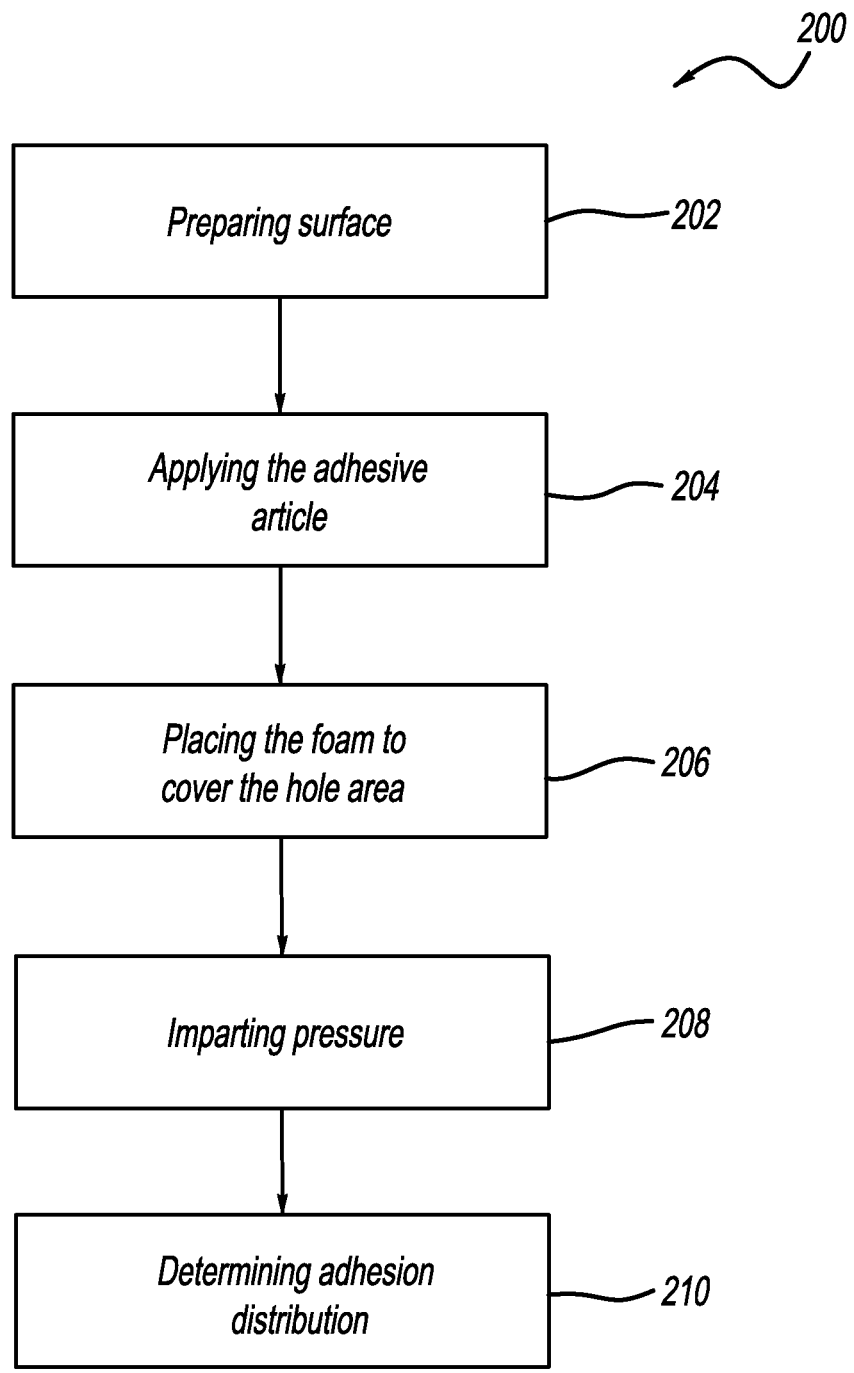
FIG. 2 depicts a non-limiting method of amending a defect on the surface referenced in FIG. 1E.

In one or more embodiments, and as illustrated depicted in FIG. 2 in view of FIG. 1E, a method generally shown at 200 may be provided to fix a defect such as a hole 114 on a surface 112 using the adhesive article 100 described herein. At step 202, the surface 112 is prepared for the adhesive to be applied. Any suitable method may be employed for the preparation. Non-limiting examples of the preparation include cleaning, degreasing and drying the surface 112, particularly areas 116, 118 bridging the hole 114.

At step 204 and step 206, the adhesive article 100 is applied to at least a portion of the areas 116 and 118 of the surface 112. The adhesive article 100 may be directly applied onto the areas 116, 118 and then a skin layer 110 is applied onto the adhesive article 100. Alternatively, the adhesive article 100 may first be applied onto a skin layer 110 and then the adhesive article 100 is made to contact the areas 116, 118 along with the skin layer 110. The adhesive article 100 may be discharged from a housing like the housing depicted in FIG. 1C or obtained by peeling off a cover 108 and a backing 106 as depicted in FIG. 1D.

At step 208, pressure is applied onto the skin layer 110 to initiate and develop a desirable adhesion between the skin layer 110 and the surface 112. In particular, pressure may be imparted by hand or by machinery on the skin layer 110 at or near locations corresponding to the areas 116, 118. In practice, the amount of pressure applied onto the skin layer 110 is usually in excess of the amount of pressure needed to rupture the color balloons 104 that come under the pressure. Therefore, as long as a color balloon 104 is under the pressure, complete rupture and release of the colored agent 124 should be obtained. It follows that a color distribution within the adhesive article 100 should correlate with the distribution of pressure as applied.

The method 200 may further include a step of determining adhesion distribution generally shown at step 210. This may be accomplished indirectly by examining and/or determining color distribution of the released color agent 124. Any suitable methods may be used to carry out the color distribution determination. A non-limiting method may be carried out as follows. The operator would have a reference color scale that would show the color of acceptable pressure applied. Another non-limiting method may be carried out whereby a camera based system is employed to capture and measure the color and pattern of color to monitor the pressure as applied.

Referring back to FIG. 1E, the skin layer 100 may be transparent or at least semi-transparent such that the settlement pattern of the colored agent 124 as released from the shell 120 may be visibly captured by the operator and/or the camera.

In one or more embodiments, the disclosed invention as set forth herein overcomes the challenges faced by known production of polycarbonate articles such as polycarbonate articles with decorative or capacitive touch parts. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A polymeric article comprising:
   a polymeric composition including a volume of polymer intermixed with a number of color balloons, at least a portion of the number of color balloons each including a shell enclosing a colored agent; and
   one of a housing, a backing and a cover, and a skin layer, wherein the housing when employed is to enclose the polymeric composition such that the polymeric composition is dischargeable from the housing upon a force applied, wherein the backing and the cover when employed are to sandwich there between the polymeric composition, and wherein the skin layer when employed is to contact the polymeric composition, the skin layer being at least semi-transparent.

2. The polymeric article of claim 1, wherein the volume of polymer includes a water content of less than 3 percent by weight.

3. The polymeric article of claim 1, wherein the volume of polymer includes at least one of epoxy, silicone, acrylic, polysulfide and polyurethane.

4. The polymeric article of claim 1, wherein the number of color balloons has an average particle size of 1 to 1,000 microns.

5. The polymeric article of claim 1, wherein the colored agent includes water insoluble pigment in no less than 50 percent by weight.

6. The polymeric article of claim 1, wherein the colored agent includes water soluble dye in no less than 50 percent by weight.

7. The polymeric article of claim 1, wherein the shell includes glass.

8. A method of amending a hole on a surface, comprising:
   overlaying the hole on the surface with a polymeric article, the polymeric article including a layer of a polymeric composition and a skin layer, the skin layer contacting the layer of polymeric composition and being at least semi-transparent, the layer of the polymeric composition being positioned between the surface and the skin layer, the polymeric composition including a volume of polymer intermixed with a number of color balloons, at least a portion of the number of color balloons each including a shell enclosing a colored agent; and
   applying pressure onto the skin layer to effect adhesion of the skin layer to the surface such that at least a portion of the colored agent is released from the shell into the volume of polymer to form a colored polymer.

9. The method of claim 8, further comprising assessing color distribution of the colored polymer.

10. The method of claim 9, further comprising adjusting pressure application based on a result of the assessing.

11. The polymeric article of claim 7, wherein the volume of polymer includes a water content of less than 3 percent by weight.

12. The polymeric article of claim 7, wherein the volume of polymer includes at least one of epoxy, silicone, acrylic, polysulfide and polyurethane.

13. The polymeric article of claim 7, wherein the number of color balloons has an average particle size of 1 to 1,000 microns.

14. The polymeric article of claim 7, wherein the colored agent includes water insoluble pigment in no less than 50 percent by weight.

15. The polymeric article of claim 7, wherein the colored agent includes water soluble dye in no less than 50 percent by weight.

* * * * *